(12) United States Patent
Wu et al.

(10) Patent No.: US 9,541,796 B2
(45) Date of Patent: Jan. 10, 2017

(54) PIXEL ARRAY SUBSTRATE AND LIQUID CRYSTAL DISPLAY PANEL

(71) Applicant: AU Optronics Corporation, Hsin-Chu (TW)

(72) Inventors: Ming-Huei Wu, Hsin-Chu (TW);
Kun-Cheng Tien, Hsin-Chu (TW);
Shin-Mei Gong, Hsin-Chu (TW);
Jen-Yang Chung, Hsin-Chu (TW);
Wei-Chun Wei, Hsin-Chu (TW);
Chien-Huang Liao, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 373 days.

(21) Appl. No.: 14/041,071

(22) Filed: Sep. 30, 2013

(65) Prior Publication Data
US 2014/0204326 A1    Jul. 24, 2014

(30) Foreign Application Priority Data
Jan. 22, 2013    (TW) .............................. 102102336 A

(51) Int. Cl.
*G02F 1/1337*    (2006.01)
*G02F 1/1362*    (2006.01)
*G02F 1/1343*    (2006.01)

(52) U.S. Cl.
CPC ..... *G02F 1/133707* (2013.01); *G02F 1/13624* (2013.01); *G02F 1/134309* (2013.01); *G02F 2001/134345* (2013.01)

(58) Field of Classification Search
CPC .................... G02F 1/133707; G02F 1/134309; G02F 1/13624
See application file for complete search history.

(56) References Cited

U.S. PATENT DOCUMENTS

| 8,223,290 B2 * | 7/2012 | Lee ................... G02F 1/133707 257/59 |
| 2009/0046233 A1 | 2/2009 | Cho et al. |
| 2009/0322659 A1 | 12/2009 | Chan et al. |
| 2011/0156993 A1 | 6/2011 | Ting et al. |
| 2014/0063395 A1 | 3/2014 | Jung et al. |

FOREIGN PATENT DOCUMENTS

| CN | 101546073 | 9/2009 |
| CN | 101782703 | 7/2010 |
| TW | 201001038 | 1/2010 |
| TW | 201122694 | 7/2011 |
| TW | 201213988 | 4/2012 |
| TW | 201321875 | 6/2013 |

\* cited by examiner

*Primary Examiner* — Dung Nguyen
(74) *Attorney, Agent, or Firm* — WPAT, PC; Justin King

(57) ABSTRACT

A pixel array substrate with new pixel design and a liquid crystal display panel with the pixel array substrate are provided. The pixel array substrate includes a plurality of data lines, a plurality of scan lines and a plurality of pixels. Each of the pixels comprises a first electrode, a first connecting line, a second electrode and a second connecting line. The first electrode is electrically connected with corresponding data line and scan line through the first connecting line, and having a slit. The second pixel is electrically connected with corresponding data line and scan line through the second connecting line. At least a part of the second connecting line is exposed by the slit of the first electrode.

20 Claims, 13 Drawing Sheets

(A)

(B)

PIXEL ARRAY SUBSTRATE AND LIQUID CRYSTAL DISPLAY PANEL

RELATED APPLICATIONS

This application claims priority to Taiwan Application Serial Number 102102336, filed Jan. 22, 2013, which is herein incorporated by reference.

BACKGROUND

Technical Field

The present disclosure relates to a substrate, and more particularly, to a pixel array substrate of a display panel.

Description of Related Art

Liquid crystal display (LCD) panels have become the mainstream display products because of advantages such as low radiation, low power consumption and compact size. A variety of techniques in the LCD panels are developed corresponding to different needs. Among which, Vertical Alignment (VA) of the wide viewing angle display technology has wider viewing angle than that of Twisted Nematic (TN), fast responding, and high contrast ratio, thus has been widely applied in a LCD panel.

However, the VA LCD panel is known for its color washout issue. To solve the issue, the pixel area of the pixel array substrate of current VA LCD panels is divided into two parts. As illustrated in FIG. 1 and FIG. 2, FIG. 1 is a top-view of the conventional pixel, and FIG. 2 is the equivalent circuit diagram of the pixel illustrated in FIG. 1. Referring to FIG. 1 and FIG. 2, pixel 100 includes a first pixel electrode 102, a second pixel electrode 104, a first connecting line 106, and a second connecting line 108. The first electrode 102 is electrically connected to its corresponding data line DL1 and scan line SL1 through the first connecting line 106 and the a switch T1; The second pixel electrode 104 is also electrically connected to its corresponding data line DL1 and scan line SL1 through the second connecting line 108 and a switch T2. In addition, pixel 100 also includes a switch T3, storage capacitors $C_{ST1}$, $C_{ST2}$, common electrode $V_{COM}$, liquid crystal capacitors $C_{LC1}$, $C_{LC2}$, and charge-sharing capacitor Cs ($C_{CSA}$ and $C_{CSB}$). Switches T1, T2, and T3 are thin-film transistors (TFT), for example. Liquid crystal capacitors $C_{LC1}$, $C_{LC2}$ respectively represent the capacitances which are generated between pixel electrode (the first pixel electrode 102 and the second pixel electrode 104) and the electrode(s) applied with $V_{COM}$ voltage on the opposite substrate of the LCD panel (not illustrated in FIG. 1 and FIG. 2). $C_{ST1}$ and $C_{ST2}$ respectively represent the capacitances which are generated between common electrode applied with $V_{COM}$ voltage and each pixel electrode (the first pixel electrode 102 and the second pixel electrode 104) of the pixel array substrate of the LCD panel. Charge-sharing capacitor Cs is an extension from the switch T3, charge-sharing capacitor Cs forms capacitors with other conductive layers, for example, $C_{CSA}$ is the capacitor formed between the first pixel electrode 102 and Cs, and $C_{CSB}$ is the capacitor formed between the common electrode $V_{COM}$ and Cs.

As to the main display area which corresponds to the first pixel electrode 102, the switch T1 is electrically connected between data line DL1 and the first pixel electrode 102. The switch T1 is also electrically connected to scan line SL1, and a signal passing through scan line SL1 controls the switch T1 to turn on/off. The storage capacitor $C_{ST1}$ is electrically connected between the first pixel electrode 102 and the common electrode $V_{COM}$. When the switch T1 turns on, a data signal of data line DL1 is transmitted through the switch T1 to the first electrode 102, so that the storage capacitor $C_{ST1}$, is charged to have corresponding voltage.

As to the secondary display area which is corresponding to the second pixel electrode 104, the switch T2 is electrically connected between data line DL1 and the second pixel electrode 104. The switch T2 is also electrically connected to scan line SL1, a signal passing through scan line SL1 controls the switch T2 to turn on/off. The storage capacitor $C_{ST2}$ is electrically connected between the second pixel electrode 104 and the common electrode $V_{COM}$. When the switch T2 turns on, a data signal of data line DL1 is transmitted through the switch T2 to the second electrode 104, so that the storage capacitor $C_{ST2}$ is charged to have corresponding voltage. To solve the issue of color washout of the LCD panel, charge sharing is performed. After the first pixel electrode 102 and the second pixel electrode 104 are charged by the signal from scan line SL1, in next time sequence, the switch T3 turns on by the signal inputted from scan line T3, so as a part of the voltage of the second pixel electrode 104 is shared to the capacitor $C_{CSB}$ and the other part of the voltage of the second pixel electrode 104 is shared to the capacitor $C_{CSA}$ through the switch T3. It results in charge sharing between the first pixel electrode 102 and the second pixel electrode 104 by the charge-sharing capacitor Cs, the voltage of the first pixel electrode 102 increases and that of the second pixel electrode 104 decreases. Therefore, the voltages of the first pixel electrode 102 and the second pixel electrode 104 are different. It causes the tilting angle of liquid crystals corresponding to the first pixel electrode 102 and the second pixel electrode 104 are different within the same pixel 100, so as the brightness within the same pixel 100 can be optimized since the transmittance within the same pixel 100 can be different, thus the issue of color washout can be solved.

However, continually referring FIG. 1 and FIG. 2, as illustrated in dot lines area of FIG. 1, in the path of the second connecting line 108 connecting to the second pixel electrode 104, part of the path is underpass the first pixel electrode 102. This overlapping structure of the second connecting line 108 and the first pixel electrode 102 in vertical direction will generate an extra coupling capacitance Cx as illustrated in dot lines area of FIG. 2. When the coupling capacitance Cx is generated between the first pixel electrode 102 and the second pixel electrode 104, charge sharing will be weaken. Thus the effects of the voltage increase of the first pixel electrode 102 and the voltage decrease of the second pixel electrode 104 are diminished. Therefore, to increase the voltage difference between the first pixel electrode 102 and the second pixel electrode 104 becomes difficult. In order to maintain the voltage difference between the first pixel electrode 102 and the second pixel electrode 104 to solve the color washout issue, further increase the capacitance of the charge-sharing capacitor Cs to release more electric charge from the second pixel electrode 104 and lower the voltage of the second pixel electrode 104 is generally performed. However, the efficiency of the LCD panel is decreased to maintain the voltage difference between the first pixel electrode 102 and the second pixel electrode 104 in this way.

SUMMARY

The present disclosure relates to an array substrate of a display panel, which has a whole new design of pixel layout. The coupling capacitance Cx of the pixel array substrate in the present disclosure is much less than that of prior arts, the difficulty of increasing the voltage difference between the first pixel electrode and the second pixel electrode is obviously improved. Therefore, LC efficiency and the open ratio of the pixel array substrate of the present disclosure are improved under the premise of solving the issue of color washout.

The present disclosure, in one aspect, relates to a pixel array substrate includes a plurality of data lines, a plurality of scan lines, and a plurality of pixels. The plurality of scan lines is crossed to the plurality of data lines to define a plurality of pixel areas. The plurality of pixels is respectively disposed in the plurality of pixel areas, each pixel includes a first pixel electrode, a first connecting line, a second pixel electrode, and a second connecting line. The first pixel electrode is electrically connected to corresponding one of the data lines and one of the scan lines, and the first pixel electrode has a first slit. The first pixel electrode is electrically connected to corresponding data line through the first connecting line. The second pixel electrode is electrically connected to corresponding data line and scan line. The second pixel electrode is electrically connected to corresponding data line through the second connecting line, wherein at least a part of the second connecting line is exposed by the first slit of the first pixel electrode.

In one embodiment of the present disclosure, the first slit is an open slit.

In another embodiment of the present disclosure, the first slit is a closed slit.

In one embodiment of the present disclosure, the first slit is substantially parallel to the plurality of data lines.

In one embodiment of the present disclosure, the first connecting line and the second connecting line are electrically connected to the same data line.

In another embodiment of the present disclosure, the first connecting line and the second connecting line are electrically connected to different data lines.

In one embodiment of the present disclosure, the first pixel electrode includes a first sub-pixel electrode and a second sub-pixel electrode, and the first slit is substantially positioned between the first sub-pixel electrode and the second sub-pixel electrode.

In one embodiment of the present disclosure, the first sub-pixel electrode and the second sub-pixel electrode are mirror symmetry structures with respect to the first slit.

In one embodiment of the present disclosure, the first sub-pixel electrode includes a first main electrode, a second main electrode, a plurality of first branch electrodes, a plurality of second branch electrodes, a plurality of third branch electrodes, and a plurality of fourth branch electrodes. The first main electrode and the second main electrode are electrically connected and are substantially orthogonally arranged to define a first area, a second area, a third area and a fourth area. The plurality of first branch electrodes is disposed in the first area. The plurality of second branch electrodes is disposed in the second area. The plurality of third branch electrodes is disposed in the third area. The plurality of fourth branch electrodes is disposed in the fourth area. The plurality of first branch electrodes, the plurality of second branch electrodes, the plurality of third branch electrodes and the plurality of fourth branch electrodes are electrically connected with one of the first main electrode and the second main electrode, the first branch electrodes are arranged parallel to each other, the second branch electrodes are arranged parallel to each other, the third branch electrodes are arranged parallel to each other and the fourth branch electrodes are arranged parallel to each other, and the plurality of first branch electrodes, the plurality of second branch electrodes, the plurality of third branch electrodes and the plurality of fourth branch electrodes respectively extend to different directions from the first main electrode or the second main electrode, the first sub-pixel electrode and the second sub-pixel electrode are mirror symmetry structures with respect to the first slit.

In one embodiment of the present disclosure, the first main electrode is substantially parallel to the first slit, and the distance between the first main electrode and the first slit is greater than that of the first main electrode and the data line which is adjacent to the first main electrode.

In one embodiment of the present disclosure, each pixel further includes a third pixel electrode and a third connecting line. The third pixel electrode is electrically connected to corresponding data line and scan line, and the third pixel electrode has a second slit. The third pixel electrode is electrically connected to corresponding data line through the third connecting line, wherein at least a part of the second connecting line is exposed by the first slit of the first pixel electrode and the second slit of the third pixel electrode.

In one embodiment of the present disclosure, the third connecting line is disposed on an edge of the first sub-pixel electrode or the second sub-pixel electrode.

In one embodiment of the present disclosure, the third pixel electrode includes a third sub-pixel electrode and a fourth sub-pixel electrode, the second slit is substantially positioned between the third sub-pixel electrode and the fourth sub-pixel electrode, and the second slit is substantially positioned in the extending line of the first slit.

In one embodiment of the present disclosure, the first slit and the second slit are substantially parallel to the plurality of data lines, the first sub-pixel electrode and the second sub-pixel electrode are mirror symmetry structures with respect to the first slit, the third sub-pixel electrode and the fourth sub-pixel electrode are mirror symmetry structures with respect to the second slit.

In one embodiment of the present disclosure, wherein the third sub-pixel electrode and the fourth sub-pixel electrode respectively include a first main electrode, a second main electrode, a plurality of first branch electrodes, a plurality of second branch electrodes, a plurality of third branch electrodes, and a plurality of fourth branch electrodes. The first main electrode and the second main electrode are electrically connected and are substantially orthogonally arranged to define a first area, a second area, a third area and a fourth area. The plurality of first branch electrodes is disposed in the first area. The plurality of second branch electrodes is disposed in the second area. The plurality of third branch electrodes is disposed in the third area. The plurality of fourth branch electrodes is disposed in the fourth area, wherein the plurality of first branch electrodes, the plurality of second branch electrodes, the plurality of third branch electrodes and the plurality of fourth branch electrodes are electrically connected with one of the first main electrode and the second main electrode, the first branch electrodes are arranged parallel to each other, the second branch electrodes are arranged parallel to each other, the third branch electrodes are arranged parallel to each other and the fourth branch electrodes are arranged parallel to each other, and the plurality of first branch electrodes, the plurality of second branch electrodes, the plurality of third branch electrodes and the plurality of fourth branch electrodes respectively extend to different directions from the first main electrode or the second main electrode, the first sub-pixel electrode and the second sub-pixel electrode are mirror symmetry structures with respect to the first slit, the third sub-pixel electrode and the fourth sub-pixel electrode are mirror symmetry structures with respect to the second slit.

In one embodiment of the present disclosure, the first main electrode of the first sub-pixel electrode is substantially parallel to the first slit, and the distance between the first main electrode and the first slit is greater than that of the first main electrode of the first sub-pixel electrode and the data line which is adjacent to the first main electrode of the first sub-pixel electrode, the first main electrode of the third sub-pixel electrode is substantially parallel to the second slit, and the distance between the first main electrode of the third sub-pixel electrode and the second slit are greater than that of the first main electrode of the third sub-pixel electrode and the data line which is adjacent to the first main electrode of the third sub-pixel electrode.

In one embodiment of the present disclosure, the pixel array substrate further includes a plurality of first switches and a plurality of second switches. The plurality of first switches respectively disposed on a side of each pixel area, a first end of each first switch is electrically connected to respective first pixel electrode through respective first connecting line, a second end of each first switch is electrically connected to corresponding data line and scan line. The plurality of second switches respectively disposed on the side of each pixel area and electrically connected to corresponding data line and scan line, each second switch is electrically connected to corresponding second pixel electrode through corresponding second connecting line.

In one embodiment of the present disclosure, each one of the plurality of pixels further includes a charge-sharing capacitor and a third switch. A first end of the charge-sharing capacitor is electrically connected to the first pixel electrode, a second end of the charge-sharing capacitor is electrically connected to the second pixel electrode through the third switch.

The present disclosure, in another aspect, relates to a pixel array substrate includes a plurality of data lines, a plurality of scan lines, and a plurality of pixels. Each pixel includes a first pixel electrode which is electrically connected to corresponding data line and scan line, the first pixel electrode includes a first sub-pixel electrode and a second sub-pixel electrode. The second sub-pixel electrode electrically connected to the first sub-pixel electrode, wherein the first sub-pixel electrode and the second sub-pixel electrode are mirror symmetry structures with respect to a symmetry axis.

In one embodiment of the present disclosure, the symmetry axis is substantially parallel to the plurality of data lines.

In one embodiment of the present disclosure, the distance between the symmetry axis and one adjacent data line is the same as that between the symmetry axis and the other adjacent data line.

In one embodiment of the present disclosure, the first sub-pixel electrode includes a first main electrode, a second main electrode, a plurality of first branch electrodes, a plurality of second branch electrodes, a plurality of third branch electrodes and a plurality of fourth branch electrodes. The first main electrode and the second main electrode are electrically connected and are substantially orthogonally arranged to define a first area, a second area, a third area and a fourth area. The plurality of first branch electrodes is disposed in the first area. The plurality of second branch electrodes is disposed in the second area. The plurality of third branch electrodes is disposed in the third area. The plurality of fourth branch electrodes is disposed in the fourth area, wherein the plurality of first branch electrodes, the plurality of second branch electrodes, the plurality of third branch electrodes and the plurality of fourth branch electrodes are electrically connected with one of the first main electrode and the second main electrode, the first branch electrodes are arranged parallel to each other, the second branch electrodes are arranged parallel to each other, the third branch electrodes are arranged parallel to each other and the fourth branch electrodes are arranged parallel to each other, and the plurality of first branch electrodes, the plurality of second branch electrodes, the plurality of third branch electrodes and the plurality of fourth branch electrodes are respectively extend to different directions from the first main electrode or the second main electrode.

In one embodiment of the present disclosure, the first main electrode is substantially parallel to the symmetry axis, and the distance between the first main electrode and the symmetry axis is greater than that between the first main electrode and the data line which is adjacent to the first main electrode.

In one embodiment of the present disclosure, the pixel array substrate further includes a second pixel electrode and a second connecting line. The second pixel electrode is electrically connected to corresponding data line and scan line. The second pixel electrode is electrically connected to corresponding data line through the second connecting line, wherein the second connecting line is positioned along the direction of the symmetry axis.

In one embodiment of the present disclosure, the first pixel electrode and the second pixel electrode are electrically connected to the same data line.

In another embodiment of the present disclosure, the first pixel electrode and the second pixel electrode are respectively electrically connected to different data lines.

In one embodiment of the present disclosure, the first pixel electrode has a first slit which is along the direction of the symmetry axis to expose a part of the second connecting line.

In one embodiment of the present disclosure, the pixel array substrate further includes a third pixel electrode and a third sub-pixel electrode. The third pixel electrode is disposed between the first pixel electrode and the second pixel electrode, and electrically connected to corresponding data line and scan line, the third pixel electrode includes a third sub-pixel electrode and a fourth sub-pixel electrode. The fourth sub-pixel electrode electrically connected to the third sub-pixel electrode, wherein the third sub-pixel electrode and the fourth sub-pixel electrode are mirror symmetry structures with respect to the symmetry axis.

In one embodiment of the present disclosure, the third sub-pixel electrode and the fourth sub-pixel electrode respectively includes a first main electrode, a second main electrode, a plurality of first branch electrodes, a plurality of second branch electrodes, a plurality of third branch electrodes and a plurality of fourth branch electrodes. The first main electrode and the second main electrode are electrically connected and are substantially orthogonally arranged to define a first area, a second area, a third area and a fourth area. The plurality of first branch electrodes is disposed in the first area. The plurality of second branch electrodes is disposed in the second area. The plurality of third branch electrodes is disposed in the third area. The plurality of fourth branch electrodes is disposed in the fourth area, wherein the plurality of first branch electrodes, the plurality of second branch electrodes, the plurality of third branch electrodes and the plurality of fourth branch electrodes are electrically connected with one of the first main electrode and the second main electrode, the first branch electrodes are arranged parallel to each other, the second branch electrodes are arranged parallel to each other, the third branch electrodes are arranged parallel to each other and the fourth branch electrodes are arranged parallel to each other, and the plurality of first branch electrodes, the plurality of second branch electrodes, the plurality of third branch electrodes and the plurality of fourth branch electrodes respectively extend to different directions from the first main electrode or the second main electrode.

In one embodiment of the present disclosure, the first main electrode of the first sub-pixel electrode and the first main electrode of the third sub-pixel electrode are substantially parallel to the symmetry axis, and the distance between the first main electrode and the symmetry axis is greater then that between the first main electrode and adjacent data line.

In one embodiment of the present disclosure, the first pixel electrode has a first slit which is along the direction of the symmetry axis, and the third pixel electrode has a second slit which is also along the direction of the symmetry axis to expose a part of the second connecting line.

The present disclosure, in another aspect, relates to a LCD panel, includes the pixel array substrate aforementioned, an opposite substrate, and a liquid crystal layer. The opposite substrate is disposed above the pixel array substrate. The liquid crystal layer is disposed between the pixel array substrate and the opposite substrate.

BRIEF DESCRIPTION OF THE DRAWINGS

The disclosure may be more fully understood by reading the following detailed description of the embodiment, with reference made to the accompanying drawings as follows.

DETAILED DESCRIPTION

Figure 1:
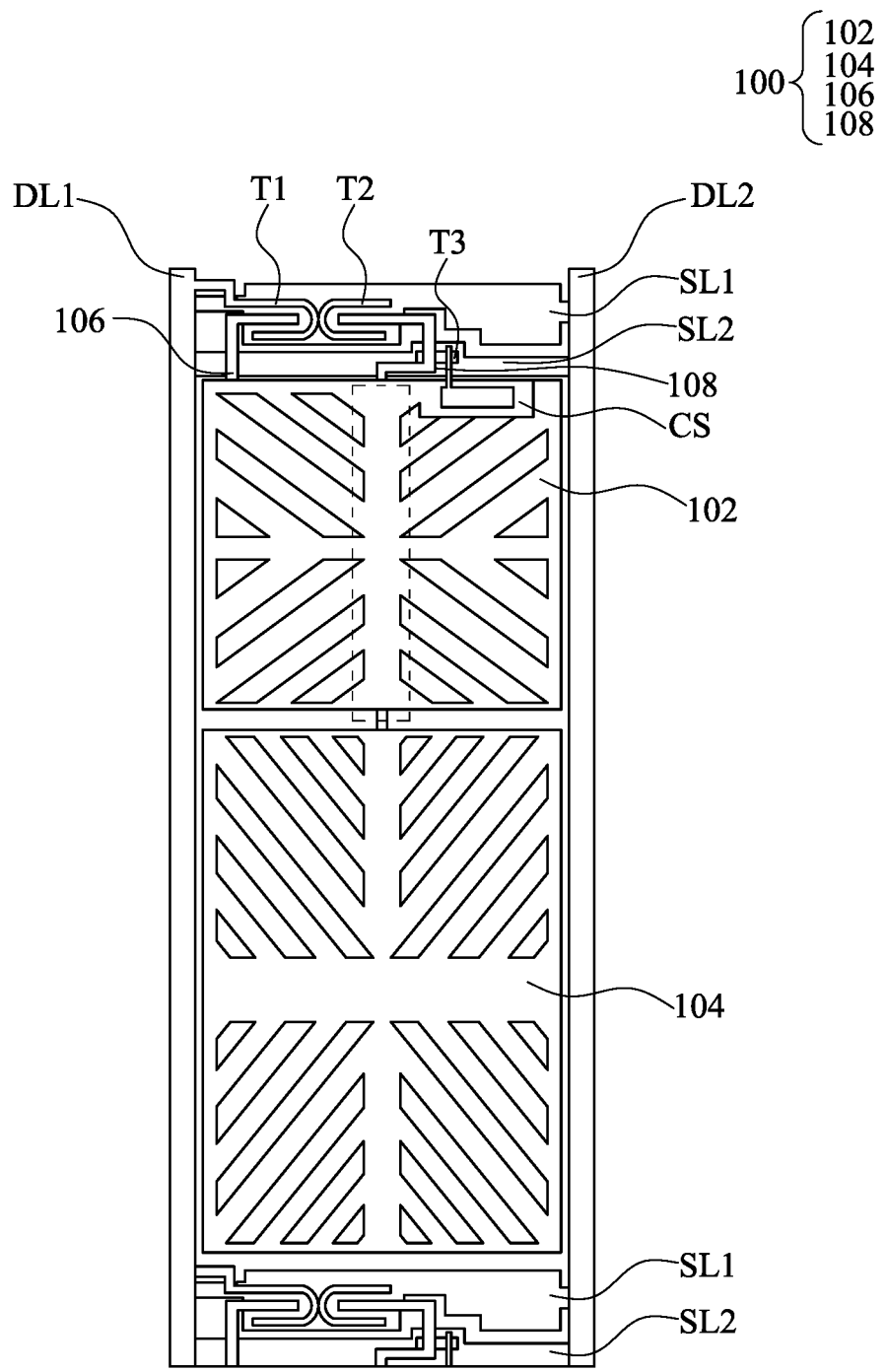
FIG. 1 illustrates a top-view of a part of the pixel layout of the conventional array substrate.
Figure 2:
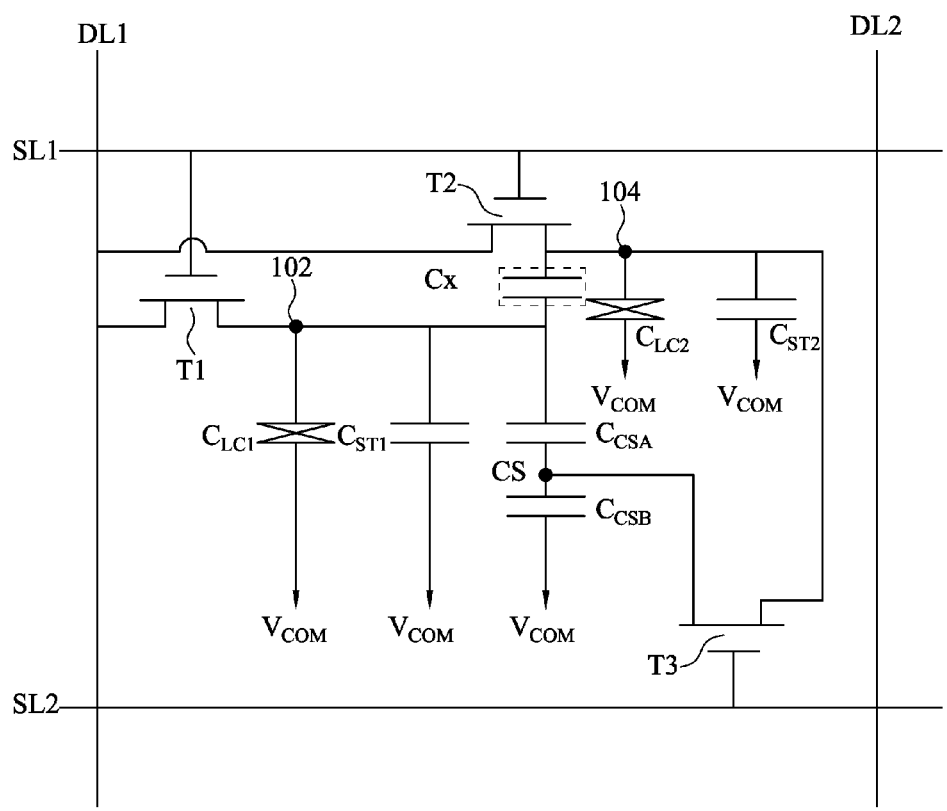
FIG. 2 illustrates the equivalent circuit diagram of the pixel layout of the array substrate illustrated in FIG. 1.

The present disclosure is described by the following specific embodiments. Those with ordinary skill in the arts can readily understand the other advantages and functions of the present invention after reading the disclosure of this specification. The present disclosure can also be implemented with different embodiments. Various details described in this specification can be modified based on different viewpoints and applications without departing from the scope of the present disclosure.

As used herein, the singular forms "a," "an" and "the" include plural referents unless the context clearly dictates otherwise. Therefore, reference to, for example, a data sequence includes aspects having two or more such sequences, unless the context clearly indicates otherwise.

Reference will now be made in detail to the embodiments of the present disclosure, examples of which are illustrated in the accompanying drawings. Wherever possible, the same reference numbers are used in the drawings and the description to refer to the same or like parts.

Figure 3:
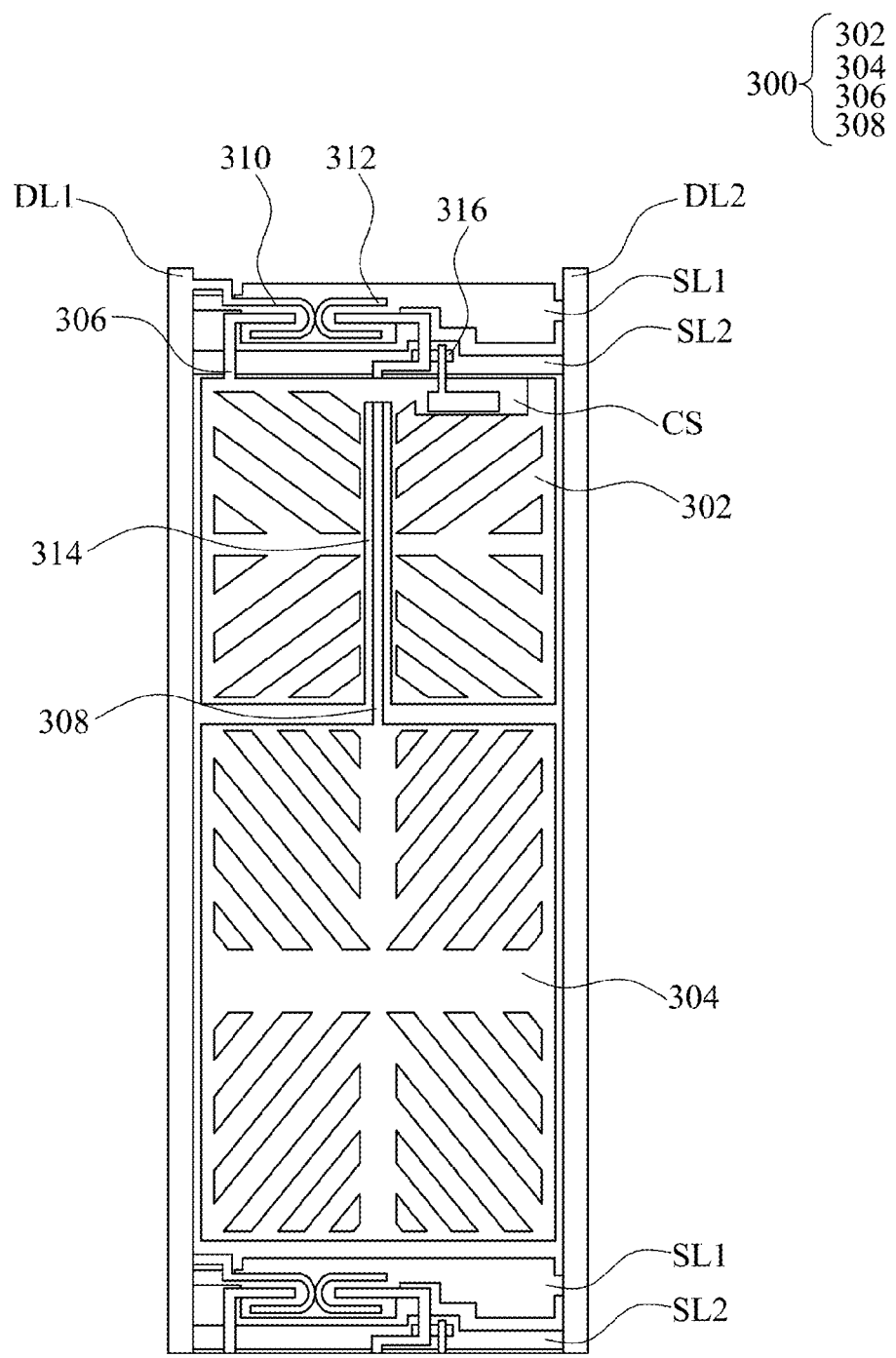
FIG. 3 illustrates a top-view of a part of one embodiment of the pixel layout of the pixel array substrate of the present disclosure.
Figure 4:
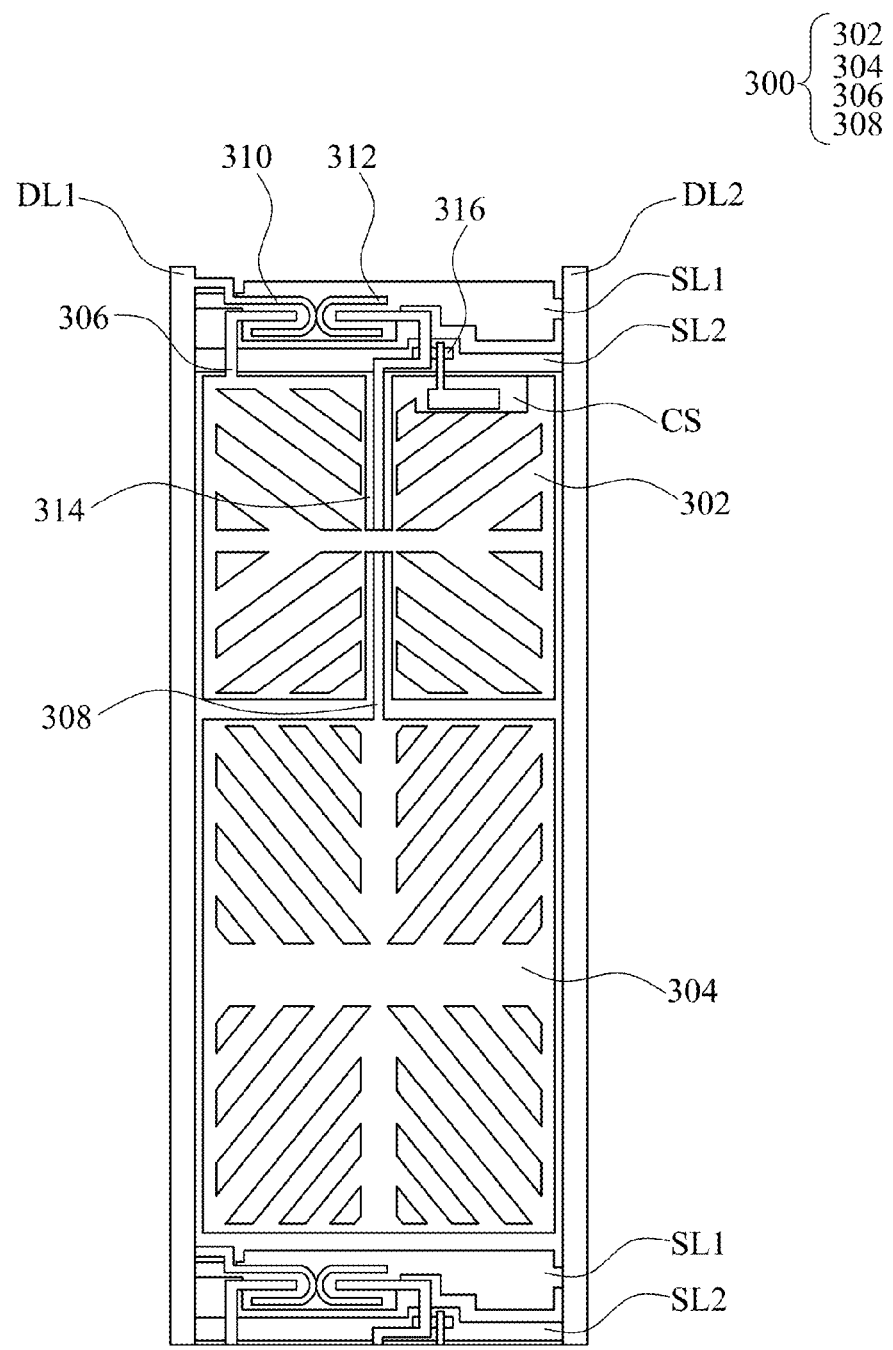
FIG. 4 illustrates a top-view of a part of another embodiment of the pixel layout of the pixel array substrate of the present disclosure.
Figure 5:
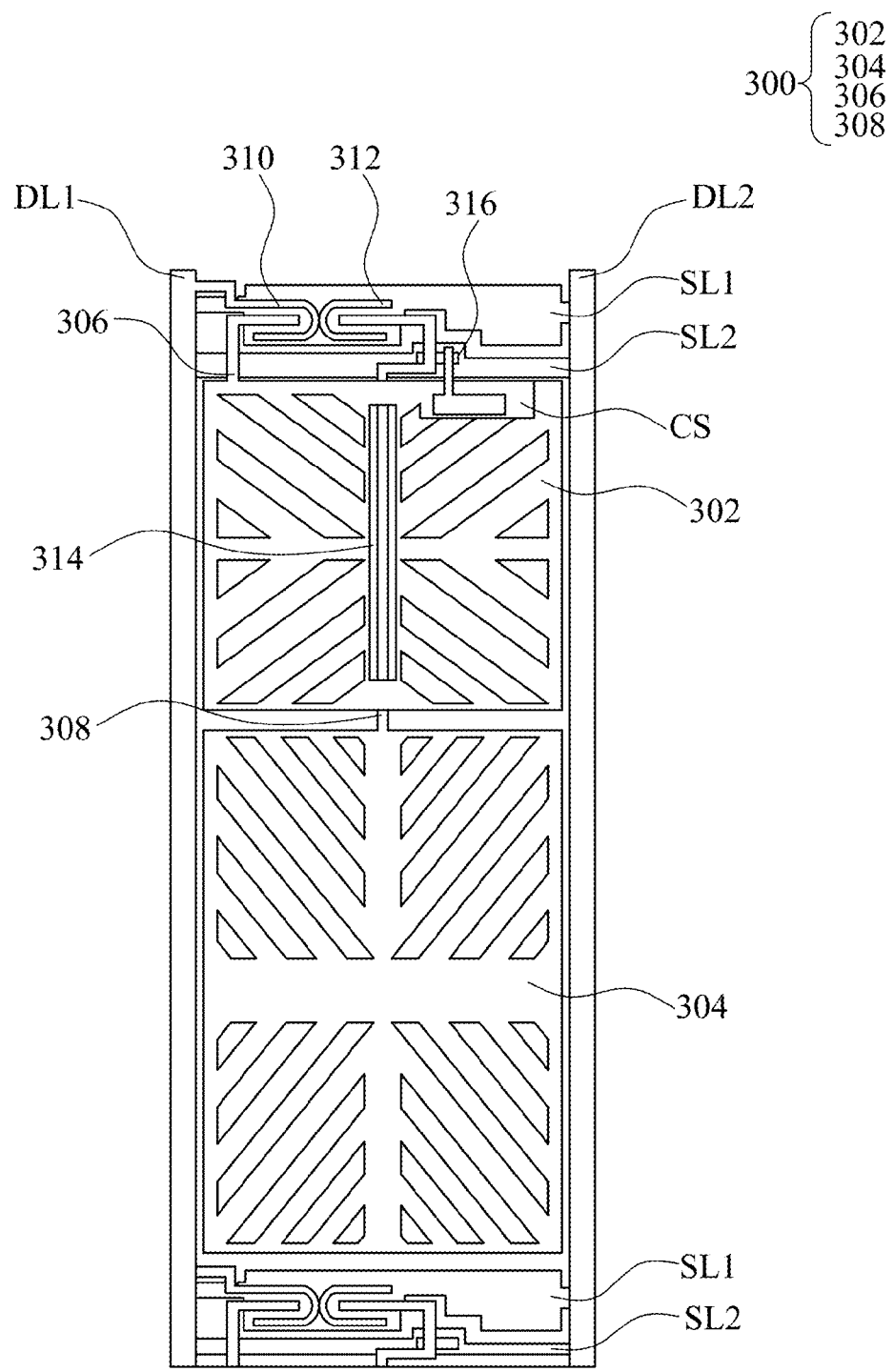
FIG. 5 illustrates a top-view of a part of another embodiment of the pixel layout of the pixel array substrate of the present disclosure.

Referring FIG. 3, FIG. 3 illustrates a part of one embodiment of the pixel array substrate of the present disclosure. The pixel array substrate of this embodiment includes data lines, scan lines and pixels. The scan lines are crossed to the data lines to define pixel areas. The pixels are respectively disposed in the pixel areas. As illustrated in FIG. 3, two adjacent scan lines SL1, SL2 (the upper group of scan lines SL1, SL2 provides the scan signals to the pixel illustrated in FIG. 3, and the lower group of scan lines SL1, SL2 provides the scan signals to the pixel which is not illustrated in FIG. 3) are crossed to two adjacent data lines DL1, DL2. A pixel 300 is disposed in a pixel area which is defined by two adjacent scan lines SL1 and two adjacent data lines DL1, DL2. The pixel 300 includes a first pixel electrode 302, a first connecting line 306, a second pixel electrode 304 and a second connecting line 308. The first pixel electrode 302 is electrically connected to data line DL1 through the first connecting line 306, and the second pixel electrode 304 is electrically connected to data line DL1 through the second connecting line 308. The area of the first pixel electrode 302 and the second pixel electrode 304 may be different. In the present embodiment and the following embodiments illustrated in FIG. 4 and FIG. 5, the area of the second pixel electrode 304 is greater than that of the first pixel electrode 302, however, the present disclosure is not limited thereto. For example, the pattern of the first pixel electrode 302 and the second pixel electrode 304 are both fishbone patterns. In the present embodiment, the first pixel electrode 302 and the second pixel electrode 304 are simultaneously charged by inputting a scan signal via scan line SL1 to turn on the first switch 310 and the second switch 312 in the same time sequence, and the first pixel electrode 302 and the second pixel electrode 304 are simultaneously charged in the voltage of data line DL1. In next time sequence, the first pixel electrode 302 and the second pixel electrode 304 perform charge sharing, thus the voltage of the first pixel electrode 302 is different from that of the second pixel electrode 304. For example, the way of charge sharing may be that pixel 300 further includes a third switch T3 and charge-sharing capacitor Cs. One end of the charge-sharing capacitor Cs is electrically connected to the first pixel electrode 302, and the other end of the charge-sharing capacitor Cs is electrically connected to the second pixel electrode 304 through the third switch T3. The third switch T3 is turned on by a signal passing through scan line SL2, and the electric charges flow from the second pixel electrode 304 to the capacitor $C_{CSA}$ and $C_{CSB}$. Therefore the voltage of the first pixel electrode 302 is increased and the voltage of the second pixel electrode 304 is decreased. However, the present disclosure is not limited thereto. It should be noticed that, the first pixel electrode 302 has a first slit 314, and the second connecting line 308 of the second pixel electrode 304, which electrically connects the second pixel electrode 304 and its corresponding data line DL1 and scan line SL1, is exposed by the first slit 314. Therefore, the overlapping structure of the second connecting line 308 and the first pixel electrode 202 in vertical direction is much less than that of the conventional structure. Accordingly, the coupling capacitance Cx induced by the overlapping structure is minimized. As illustrated in FIG. 3 and FIG. 4, the first slit 314 can be an open slit, but not limited to it. As illustrated in FIG. 5, the first slit 314 can be a closed slit, but not limited to it either. When charge sharing is performed to decrease the voltage of the second pixel electrode 304 and increase the voltage of the first pixel electrode 302 through the charge-sharing capacitor, the difficulty of increasing the voltage difference between the first pixel electrode and the second pixel electrode is improved. Since the coupling capacitance Cx in the present embodiment is much less than that of conventional arts, increasing the voltage difference between the first pixel electrode and the second pixel electrode is much easier. Accordingly, it is not necessary to further increase the capacitance of the charge-sharing capacitor Cs to decrease the voltage of the second pixel electrode 304. Therefore, the voltage of the first pixel electrode 302 of the present embodiment is higher than that of conventional arts, the voltage of the second pixel electrode 304 of the present embodiment is also higher than that of conventional arts, and the voltage difference (between the first pixel electrode 302 and the second pixel electrode 304) of the present embodiment is substantially equal to that of conventional arts. Accordingly, the present embodiment of the present disclosure is not only capable to improve the issue of color washout, but also enhance the LC efficiency of the LCD panel.

Figure 6:
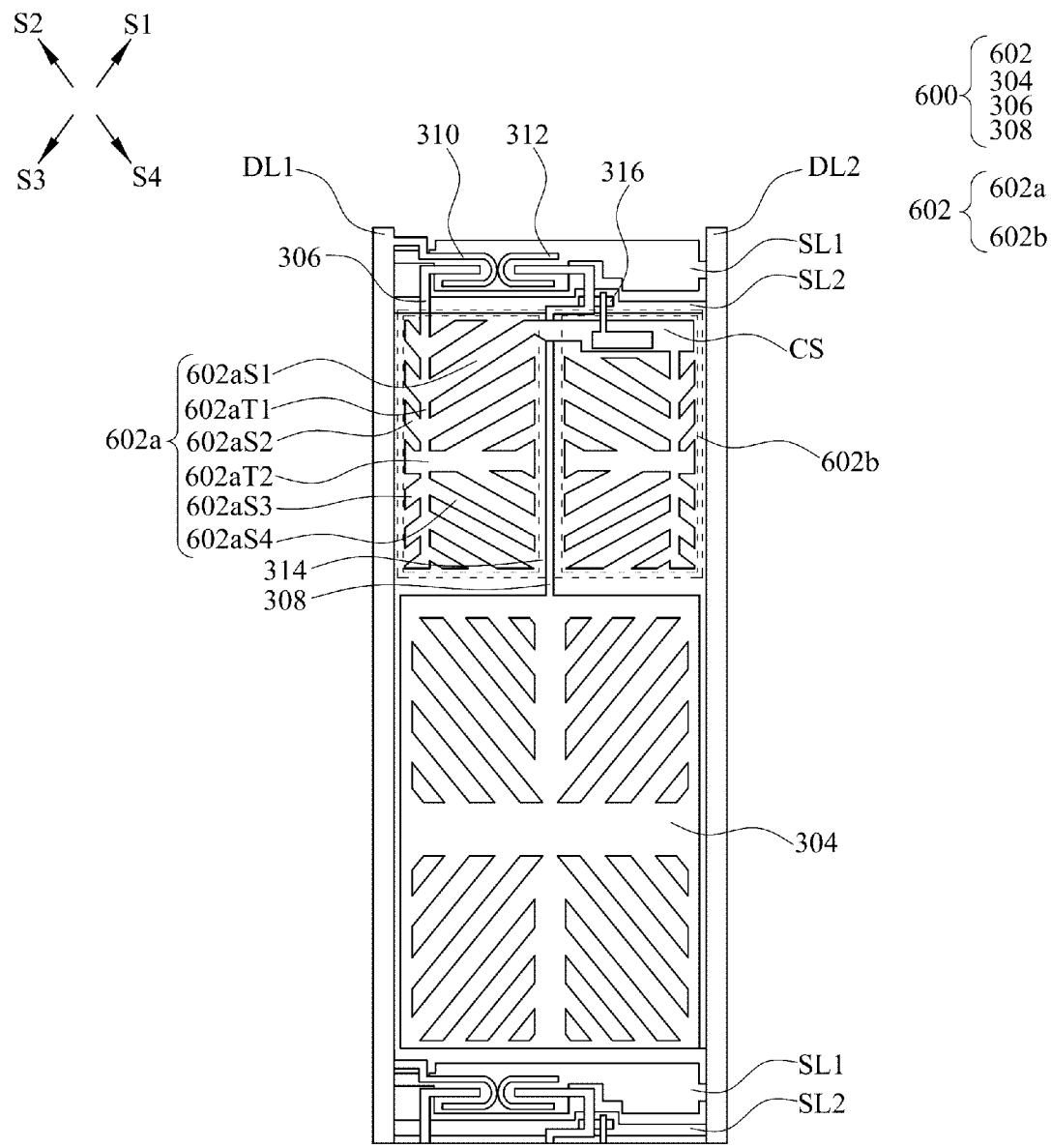
FIG. 6 illustrates a top-view of a part of another embodiment of the pixel layout of the pixel array substrate of the present disclosure.

Referring to FIG. 6, FIG. 6 is a part of another embodiment of the pixel array substrate of the present disclosure. The pixel array substrate of this embodiment includes data lines, scan lines and pixels. The scan lines are crossed to the data lines to define pixel areas. The pixels are respectively disposed in the pixel areas. That is, each pixel is respectively disposed in each pixel area. As illustrated in FIG. 6, two adjacent scan lines SL1, SL2 (the upper group of scan line SL1, SL2 provides the scan signals to the pixel illustrated in FIG. 6, and the lower group of scan line SL1, SL2 provides the scan signals to the pixel which is not illustrated) are crossed to two adjacent data line DL1, DL2. A pixel 600 is disposed in a pixel area which is defined by two adjacent scan lines SL1 and two adjacent data lines DL1, DL2. The pixel 600 includes a first pixel electrode 602, a first connecting line 306, a second pixel electrode 304, and a second connecting line 308. The area of the first pixel electrode 302 and the second pixel electrode 304 may be different. In the present embodiment, the area of the second pixel electrode 304 is greater than that of the first pixel electrode 602, however, the present disclosure is not limited thereto. The pattern of the second pixel electrode 304, for example, is the same as the aforementioned second pixel electrode 304 illustrated in FIGS. 3-5. The first pixel electrode 602 is electrically connected to data line DL1 and scan line SL1 through the first connecting line 306 and the first switch 310 respectively. The second pixel electrode 304 is electrically connected to data line DL1 and scan line SL1 through the second connecting line 308 and the second switch 312 respectively. The first pixel electrode 602 has the first slit 314, and the second connecting line 308 of the second pixel electrode 304, which electrically connects the second pixel electrode 304 and its corresponding data line DL1 and scan line SL1, is exposed by the first slit 314. It should be noticed that the first pixel electrode 602 includes the first sub-pixel electrode 602a and the second sub-pixel electrode 602b. The first slit 314 is between the first sub-pixel electrode 602a and the second sub-pixel electrode 602b. The first sub-pixel electrode 602a and the second sub-pixel electrode 602b are mirror symmetry structures with respect to the first slit 314. As illustrated in FIG. 6, the first sub-pixel electrode 602a includes a first main electrode 602aT1, a second main electrode 602aT2, first branch electrodes 602aS1, second branch electrodes 602aS2, third branch electrodes 602aS3 and fourth branch electrodes 602aS4. The first main electrode 602aT1 and the second main electrode 602aT2 are electrically connected and are substantially orthogonally arranged to define a first area, a second area, a third area and a fourth area. The first branch electrodes 602aS1, second branch electrodes 602aS2, third branch electrodes 602aS3 and fourth branch electrodes 602aS4 are respectively disposed in the first area, the second area, the third area and the fourth area. The first branch electrodes 602aS1, second branch electrodes 602aS2, third branch electrodes 602aS3 and fourth branch electrodes 602aS4 are electrically connected with one of the first main electrode 602aT1 and the second main electrode 602aT2. The first branch electrodes 602aS1 are arranged parallel to each other, the second branch electrodes 602aS2 are arranged parallel to each other, the third branch electrodes 602aS3 are arranged parallel to each other and the fourth branch electrodes 602aS4 are arranged parallel to each other. The first branch electrodes 602aS1, the second branch electrodes 602aS2, the third branch electrodes 602aS3 and the fourth branch electrodes 602aS4 are respectively extend to different directions from the first main electrode 602aT1 or the second main electrode 602aT2. To be more specific, each first branch electrode 602aS1 is electrically connected to the first main electrode 602aT1 or the second main electrode 602aT2, and each first branch electrode 602aS1 are arranged in parallel and extends outward along the direction S1. And so on the second branch electrodes 602aS2, the third branch electrodes 602aS3, and the fourth branch electrodes 602aS4 are also arranged similarly to the first branch electrodes 602aS1. The difference among them is only their respective extending directions. In other word, each second branch electrode 602aS2 are arranged in parallel and extends outward along the direction S2; each third branch electrode 602aS3 are arranged in parallel and extends outward along the direction S3; and each fourth branch electrode 602aS4 are arranged in parallel and extends outward along the direction S4.

In comparison with the pattern of the first pixel electrode 602 illustrated in FIG. 6 to that of the first pixel electrode 302 illustrated in FIG. 3, the first pixel electrode 602 illustrated in FIG. 6 has more main electrodes (such as the first main electrode 602aT1 and the second main electrode 602aT2) than that of the first pixel electrode 302 illustrated in FIG. 3. Accordingly, stronger electric field is provided to each branch electrode (such as the first branch electrodes 602aS1, the second branch electrodes 602aS2, the third branch electrodes 602aS3, and the fourth branch electrodes 602aS4 of the first sub-pixel electrode 602a), thus better control of the tilting angle of the LC molecules which are corresponding to the first pixel electrode 602 is also provided than that of the first pixel electrode 302 illustrated in FIG. 3.

Figure 7:
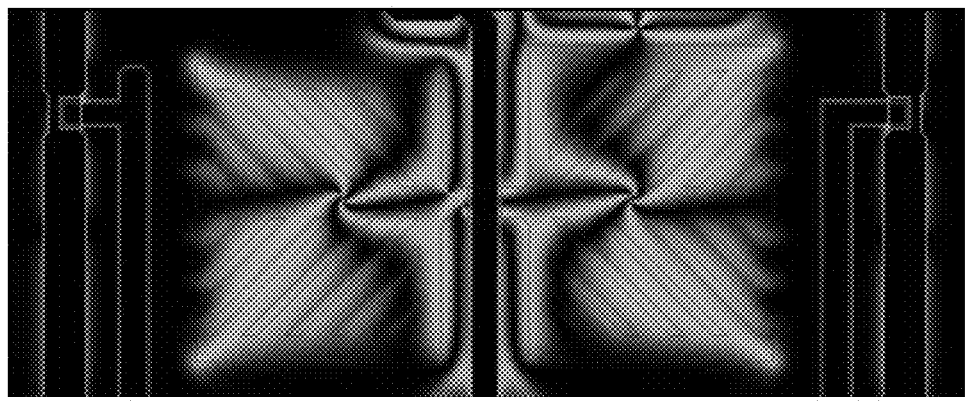
FIG. 7 illustrates the simulation of the transmittance of the pixel array substrate of the present disclosure.
Figure 7:
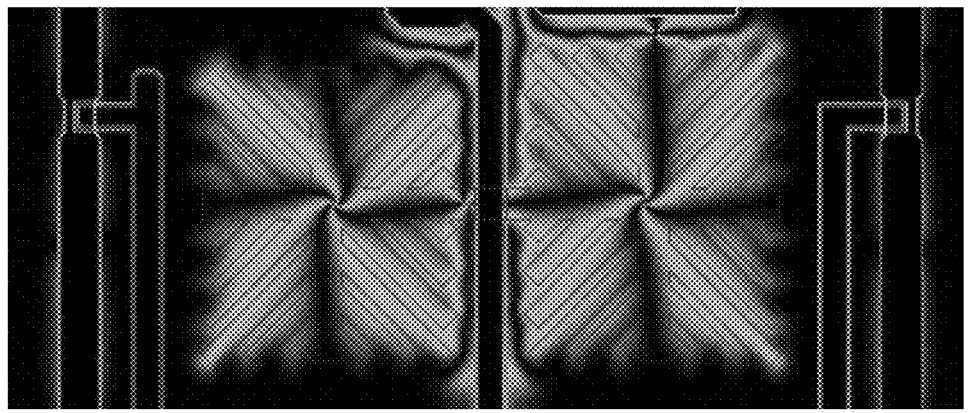

Referring to FIG. 7, the main electrodes offer stronger electric field than the branch electrodes do. However, the electric field offered by the main electrodes does not possess specific direction as that offered by the branch electrodes. Therefore, the LC molecules corresponding to the main electrodes do not tilt in one specific direction, and the transmittance corresponding to the main electrodes is substantially zero. Accordingly, the positions, which are corresponded to the main electrodes of the LCD panel, usually display black lines.

FIG. 7(A) illustrates the transmittance simulation of the first pixel electrode 302 (as aforementioned embodiments in FIGS. 3-5). The slit 314 can be regarded as the edge of the domain of the pixel electrode 302. The electric field at the edge of the domain of the pixel electrode 302 will conflict with that in adjacent data line. Therefore, the controlling of the electric field of the whole pixel electrode is weak. Accordingly, the black lines in vertical direction could randomly appear in any region of the whole pixel electrode. In contrast, FIG. 7(B) illustrates the transmittance simulation of the first pixel electrode having the main electrodes (as the first sub-pixel electrode 602a and the second sub-pixel electrode 602b in FIG. 6). Because the main electrodes in vertical direction improve the control of the electric field of the whole pixel electrode, the LC molecules will tilt along the slits which are between the branches of the sub-pixel electrode. The issue of LC molecules tilting conflicts does not occur, hence the black lines in vertical direction can be restricted in the positions along a vertical direction which are corresponded to the main electrodes. Therefore, the first sub-pixel electrode 602a and the second sub-pixel electrode 602b (illustrated in FIG. 6) control the positions of the black lines better than the pixel electrode 302 (illustrated in FIG. 3) do.

Referring to FIG. 6 again, the first main electrode 602aT1 is substantially parallel to the first slit 314, and the distance between the first main electrode 602aT1 and the first slit 314 is greater than that between the first main electrode 602aT1 and the data line DL1 which is adjacent to the first main electrode 602aT1. The first main electrode 602aT1 is substantially between data line DL1 and the first slit 314. That is, the first main electrode 602aT1 is disposed at the edge of the pixel area. Therefore, the black lines in vertical direction can be restricted at the edge of the pixel area by the main electrodes in vertical direction. Accordingly, the open ratio of the pixel is increased. In summary, the embodiment illustrated in FIG. 6 of the present disclosure not only minimizes the issue caused by the coupling capacitor Cx and improves the LC efficiency of the LCD panel, but also improves the open ratio of the pixel by restricting the black lines at the edge of the pixel are.

Figure 8:
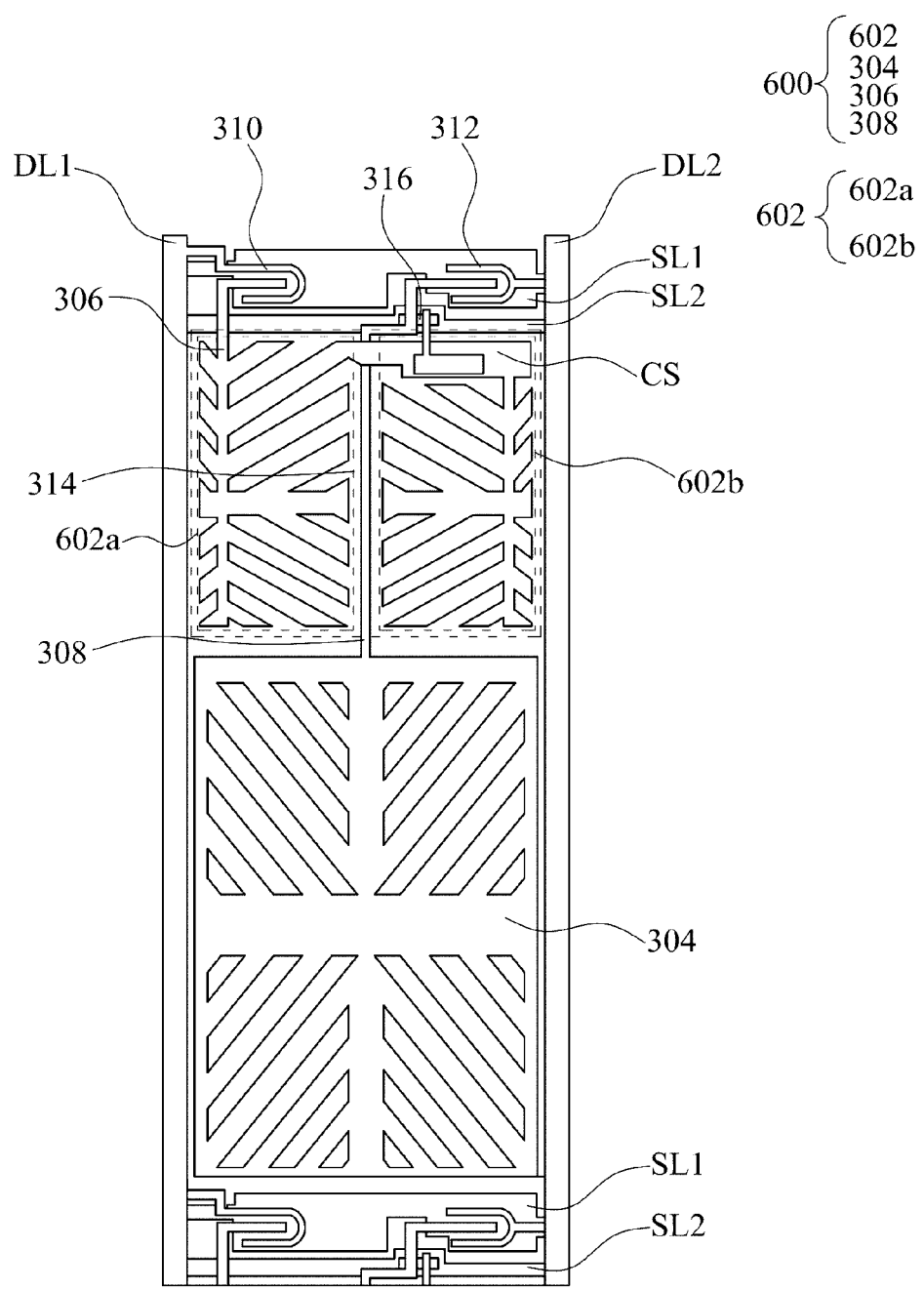
FIG. 8 illustrates a top-view of a part of another embodiment of the pixel layout of the pixel array substrate of the present disclosure.

Referring to FIG. 8, FIG. 8 illustrates a part of the pixel array substrate of another embodiment of the present disclosure. The connections between each element are similar to described above, therefore the details are omitted here. It should be noticed that the first connecting line 306 and the second connecting line 308 are respectively electrically connected to different data lines. The first connecting line 306 is electrically connected to data line DL1 through the first switch 310, the second connecting line 308 is electrically connected to data line DL2 through the second switch 312. Therefore, the first pixel electrode 602 and the second pixel electrode 304 can be respectively charged with different voltages by data line DL1 and date line DL2 in the same time sequence. Specifically, in one time sequence, one scan signal is transmitted by the same scan line SL1 and the first switch 310 and the second switch 312 are turned on, so that the first pixel electrode 602 and the second pixel electrode 304 can be charged with data line DL1 and data line DL2 respectively and possesses different voltages.

Figure 9:
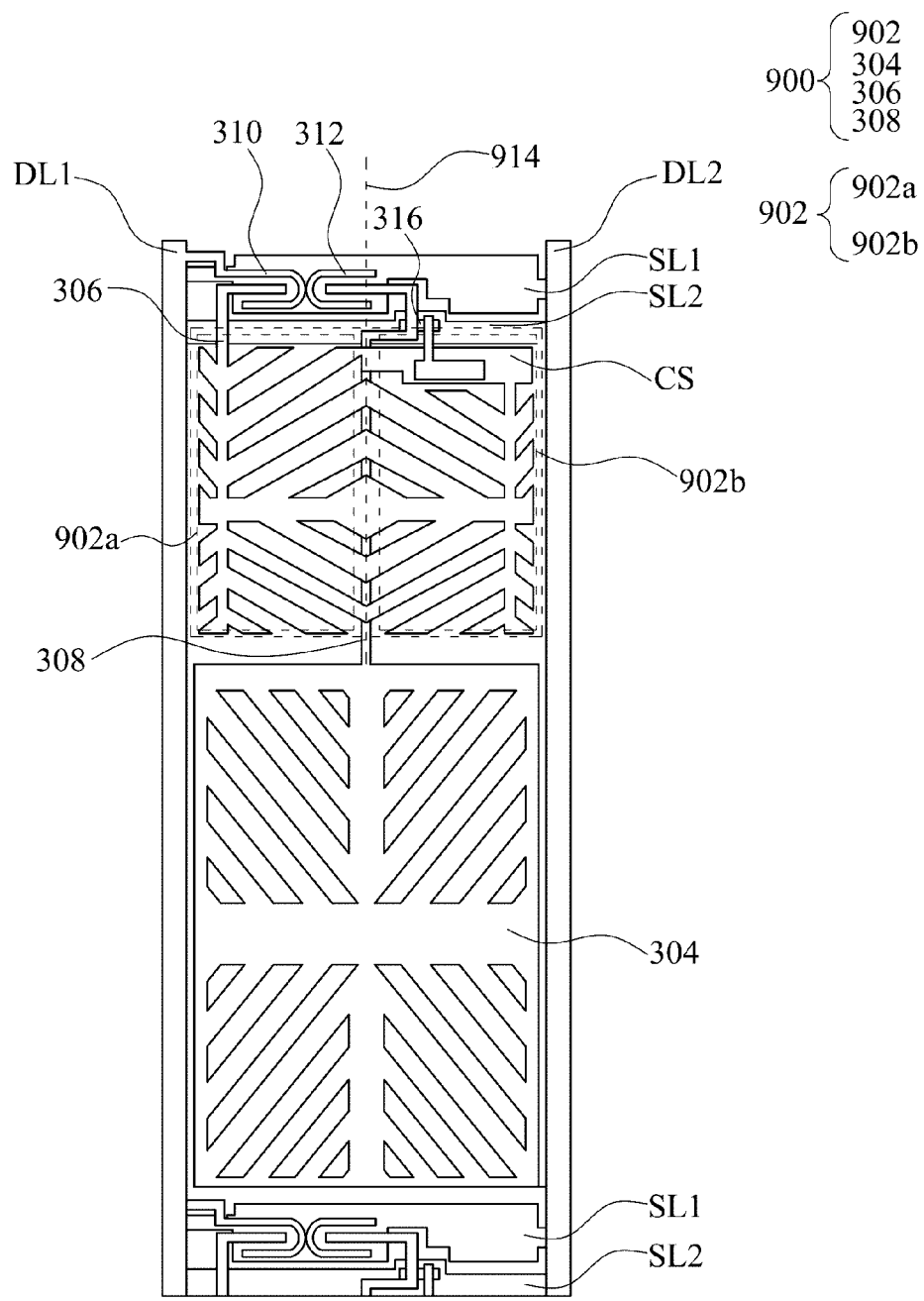
FIG. 9 illustrates a top-view of a part of another embodiment of the pixel layout of the pixel array substrate of the present disclosure.

Referring FIG. 9, FIG. 9 illustrates a part of the pixel array substrate of another embodiment of the present disclosure. The pixel array substrate of this embodiment includes data lines, scan lines and pixels. The scan lines are crossed to the data lines to define pixel areas. The pixels are respectively disposed in the pixel areas. Each pixel is respectively disposed in each pixel area. As illustrated in FIG. 9, two adjacent scan lines SL1, SL2 (the upper group of scan line SL1, SL2 provides the scan signals to the pixel illustrated in FIG. 9, and the lower group of scan line SL1, SL2 provides the scan signals to the pixel which is not illustrated in FIG. 9) are crossed to two adjacent data lines DL1, DL2. A pixel 900 is disposed in the pixel area which is defined by two adjacent scan lines SL1 and two adjacent data lines DL1, DL2. The pixel 900 includes a first pixel electrode 902, a first connecting line 306, a second pixel electrode 304 and a second connecting line 308. The first pixel electrode 902 is electrically connected to data line DL1 and scan line SL1 through the first connecting line 306 and the first switch 310 respectively, and the second pixel electrode 304 is electrically connected to data line DL1 and scan line SL1 through the second connecting line 308 and the second switch 312 respectively. It should be noticed that, the first pixel electrode 902 includes a first sub-pixel electrode 902a and a second sub-pixel electrode 902b. The first sub-pixel electrode 902a and the second sub-pixel electrode 902b are mirror symmetry structures with respect to a symmetry axis 914. Two adjacent data lines DL1, DL2 are also mirror symmetry structures with respect to the symmetry axis 914. The distance between the symmetry axis 914 and the data line DL1 may be substantially the same as the distance between the symmetry axis 914 and the data line DL2. In addition, the first pixel electrode 902 may include the first sub-pixel electrode 902a and the second sub-pixel electrode 902b (the same as that illustrated in FIG. 6), and the pattern of the first sub-pixel electrode 902a and the second sub-pixel electrode 902b also can be the same as that illustrated in FIG. 6. Therefore, the details are omitted here. However, it should be noticed that, the first pixel electrode 902 illustrated in FIG. 9 does not have the first slit 314 as the first pixel electrode 602 illustrated in FIG. 6. More specifically, the first sub-pixel electrode 902a and the second sub-pixel electrode 902b of the first pixel electrode 902 are not separated as the first sub-pixel electrode 602a and the second sub-pixel electrode 602b of the first pixel electrode 602 are separated by the first slit 314. In contrast, the first sub-pixel electrode 902a and the second sub-pixel electrode 902b are connected by some of their branch electrodes. There are slits between those connected branch electrodes to expose part of the second connecting line 308. As shown in FIG. 9, the first main electrode of the present embodiment can also be disposed at the edge of the pixel area to increase the open ratio of the pixel. Besides, the overlapping of the second connecting line 308 and the first pixel electrode 902 in vertical direction is also less than that of conventional arts (as shown in FIG. 1). It results in that the coupling capacitance Cx generated by the overlapping of the second connecting line 308 and the first pixel electrode 902 is reduced. Accordingly, the pixel array substrate of the present embodiment does not only improve the open ratio within each pixel on the pixel array substrate, but also reduce the issue which is caused by the coupling capacitance Cx in conventional arts. Therefore, the target of solving color washout is achieved, and the LC efficiency of the LCD panel is also improved.

Figure 10:
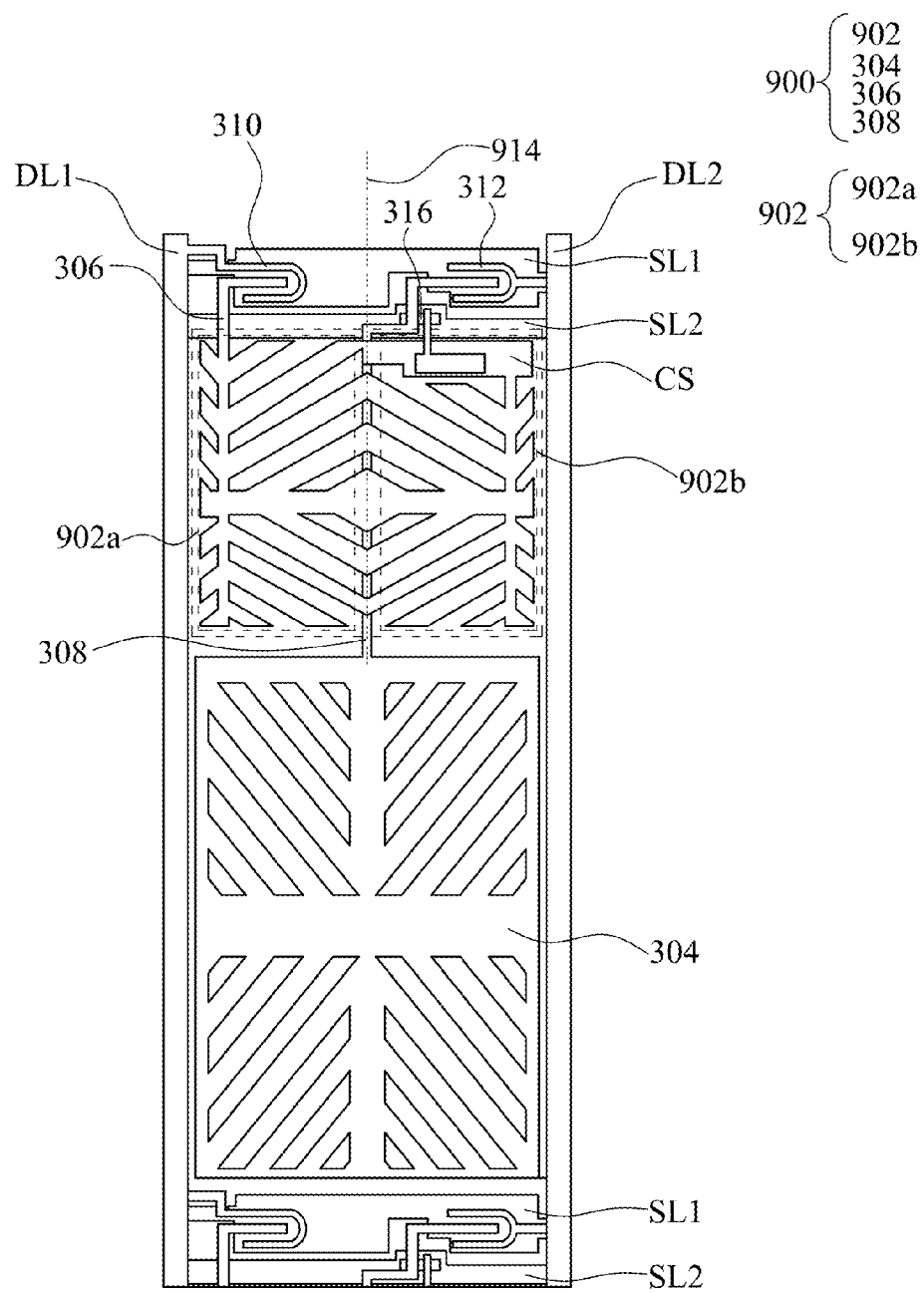
FIG. 10 illustrates a top-view of a part of another embodiment of the pixel layout of the pixel array substrate of the present disclosure.

Referring to FIG. 10, FIG. 10 illustrates a part of the pixel array substrate of another embodiment of the present disclosure. The connections of elements are similar to those described in last paragraph; therefore the details are omitted here. The only difference in the present embodiment is that the first connecting line 306 and the second connecting line 308 are electrically connected to different data lines. Specifically, the first connecting line 306 is electrically connected to data line DL1 through the first switch 310, and the second connecting line 308 is electrically connected to data line DL2 through the second switch 312. Therefore, the first pixel electrode 902 and the second pixel electrode 304 can be respectively charged with different voltages by data line DL1 and date line DL2 in the same time sequence. Specifically, in one time sequence, one scan signal is transmitted by the same scan line SL1 and the first switch 310 and the second switch 312 are turned on, so that the first pixel electrode 902 and the second pixel electrode 304 can be charged with data line DL1 and data line DL2 respectively and possesses different voltages.

Figure 11:
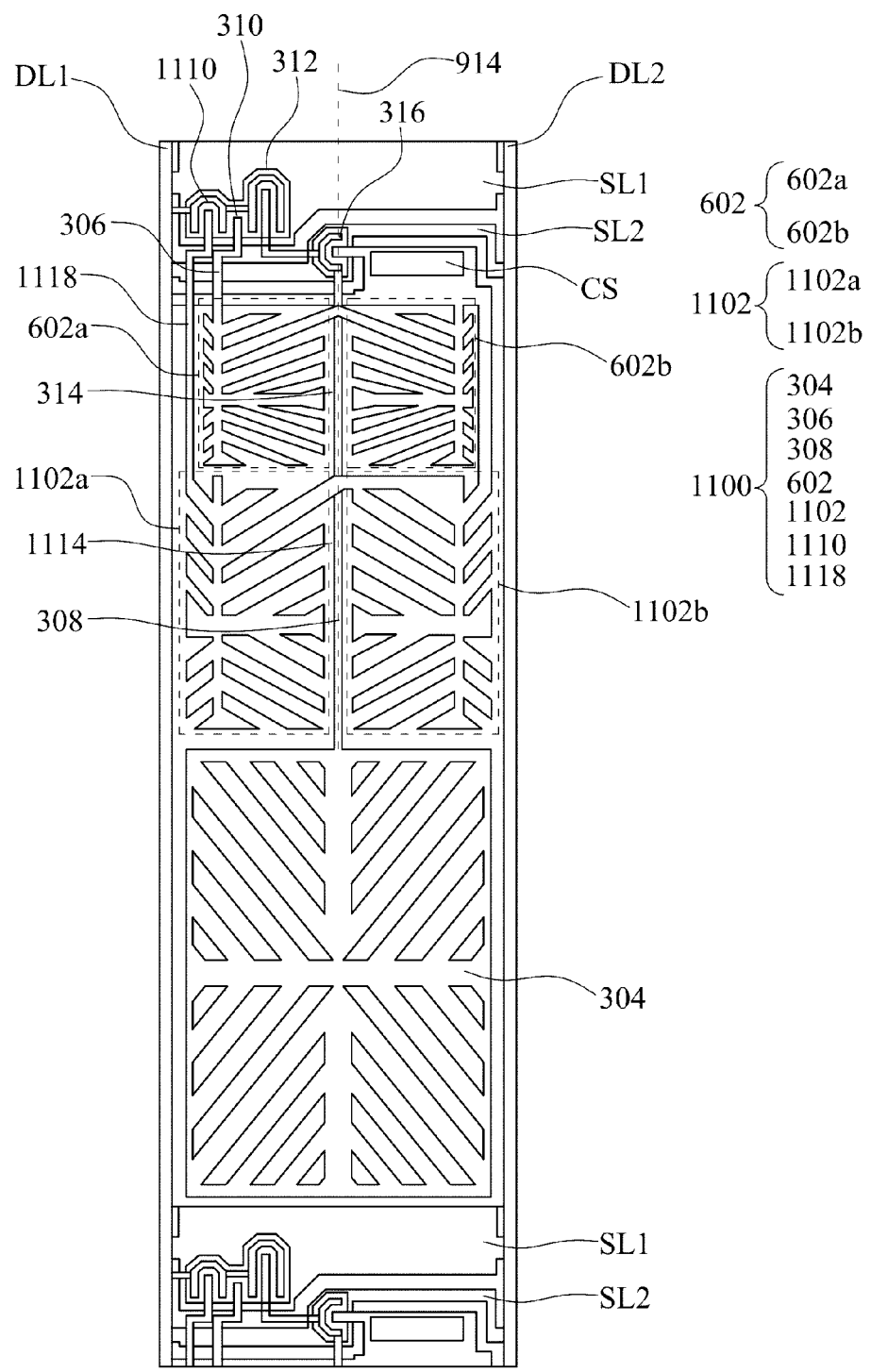
FIG. 11 illustrates a top-view of a part of another embodiment of the pixel layout of the pixel array substrate of the present disclosure.
Figure 12:
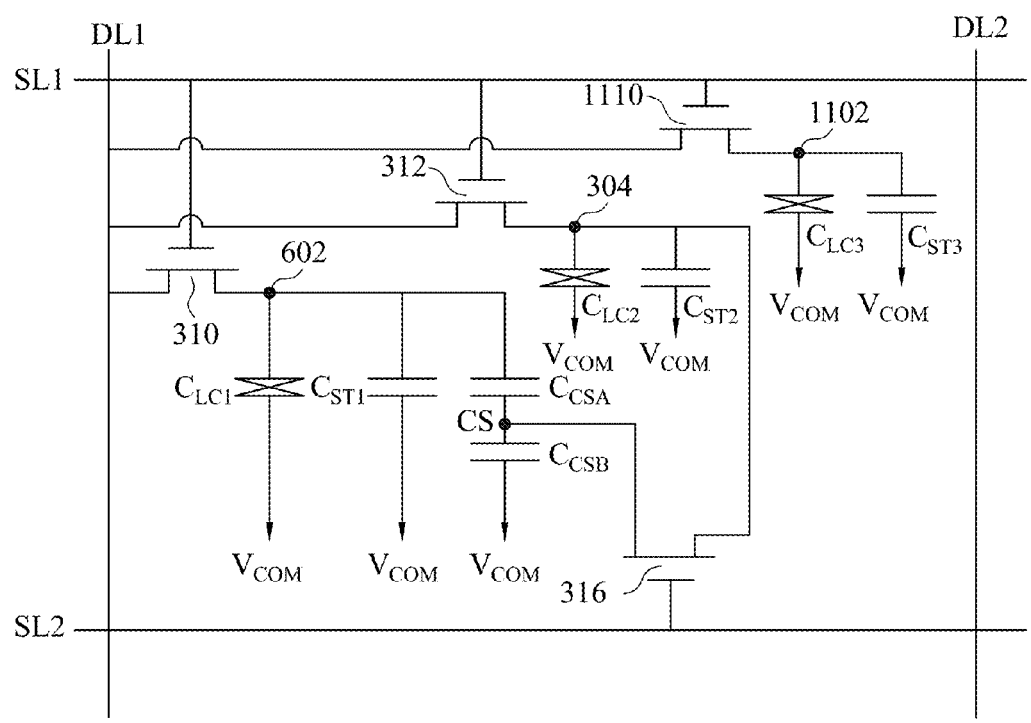
FIG. 12 illustrates the equivalent circuit diagram of the pixel layout of the pixel array substrate of the present disclosure illustrated in FIG. 11.

Referring to FIG. 11, FIG. 11 illustrates a part of the pixel array substrate of another embodiment of the present disclosure. The elements in FIG. 11 which are the same as those in FIG. 6 are labeled the same. The connections between those elements are also the same as aforementioned, and the details are omitted here. It should be noticed that the pixel in FIG. 11 further includes a third pixel electrode 1102, a fourth switch 1110 and a third connecting line 1118. The third pixel electrode 1102 is electrically connected to corresponding data line DL1 through the third connecting line 1118 and the fourth switch 1110, and the third pixel electrode 1102 has a second slit 1114. The third pixel electrode 1102 can be disposed between the first pixel electrode 602 and the second pixel electrode 304. However, the present disclosure is not limited thereto. The third connecting line 1118 may be disposed at the edge of the first pixel electrode 602 or the second pixel electrode 304, but the present disclosure is still not limited thereto. As long as the third connecting line 1118 is not overlapped with the first pixel electrode 602 and the second pixel electrode 304 in vertical direction, the coupling capacitance Cx is not induced. Besides, as illustrated in FIG. 12 (FIG. 12 illustrates the equivalent circuit diagram of FIG. 11), the first switch 310 is electrically connected between data line DL1 and the first pixel electrode 602. The first switch 310 is also electrically connected to scan line SL1, and is controlled by the input signals from scan line SL1. The storage capacitor $C_{ST1}$ is electrically connected between the first pixel electrode 602 and the common electrode $V_{COM}$. When the first switch 310 is turned on, the data signal of data line DL1 is transmitted to the storage capacitor $C_{ST1}$ and the first pixel electrode 602 through the first switch 310. The storage capacitor $C_{ST1}$ and the first pixel electrode 602 are charged to corresponding voltages according to the data signals. The second switch 312 is electrically connected between data line DL1 and the second pixel electrode 304. The second switch 312 is also electrically connected to scan line SL1, and is controlled by the input signals from scan line SL1. The storage capacitor $C_{ST2}$ is electrically connected between the second pixel electrode 304 and the common electrode $V_{COM}$. When the second switch 312 is turned on, the data signal of data line DL1 is transmitted to the storage capacitor $C_{ST2}$ through the second switch 310, so that the storage capacitor $C_{ST2}$ is charged to corresponding voltage according to the data signal. The fourth switch 1110 is electrically connected between data line DL1 and the third pixel electrode 1102. The fourth switch 1110 is also electrically connected to scan line SL1, and is controlled by the input signals from scan line SL1. The storage capacitor $C_{ST3}$ is electrically connected between the third pixel electrode 1102 and the common electrode $V_{COM}$. When the fourth switch 1110 is turned on, the data signal of data line DL1 is transmitted to the storage capacitor $C_{ST3}$ through the fourth switch 1110, so that the storage capacitor $C_{ST3}$ is charged to corresponding voltage according to the data signal. Accordingly, the liquid crystal capacitors $C_{LC\ 1\sim3}$ and the storage capacitors $C_{ST1\sim3}$ are charged to their corresponding voltages in the same time. Further, to solve the issue of color washout of LCD panels, charge sharing is performed. That is, in next time sequence right after the signal is transmitted by scan line SL1, the first switch 316 is turned on by the signal which is transmitted by scan line SL2. One part of the voltage of the second pixel electrode 304 is shared to the capacitor $C_{CSB}$ and the other part of the voltage of the second pixel electrode 304 is shared to the capacitor $C_{CSA}$. In other words, charge sharing is performed between the first pixel electrode 602 and the second pixel electrode 304 through the charge-sharing capacitor Cs so that the voltage of the first pixel electrode 602 increases and the voltage of the second pixel electrode 304 decreases. In the other hand, the third pixel electrode 1102 is not relevant to the charge sharing but keeps its original voltage. As a result, the first pixel electrode 602, the second pixel electrode 304 and the third pixel electrode 1102 possesses different voltages, and the LC molecules of different pixel areas (which are corresponded to the first pixel electrode 602, the second pixel electrode 304, and the third pixel electrode 1102 respectively) have different tilting angles. Accordingly, different transmittances within one pixel are achieved, so as the issue of color washout can be improved.

Referring to FIG. 11, the third pixel electrode 1102 includes a third sub-pixel electrode 1102a and a fourth sub-pixel electrode 1102b. The second slit 1114 is substantially disposed between the third sub-pixel electrode 1102a and the fourth sub-pixel electrode 1102b, and the second slit 1114 is substantially positioned along the extending line of the first slit 314. The third sub-pixel electrode 1102a and the fourth sub-pixel electrode 1102b of the third pixel electrode 1102 are similar to the first sub-pixel electrode 602a and the second sub-pixel electrode 602b of the first pixel electrode. The third sub-pixel electrode 1102a and the fourth sub-pixel electrode 1102b are mirror symmetry structures with respect to the second slit 1114, and the pattern of the third sub-pixel electrode 1102a may be the same as that of the first sub-pixel electrode 602a, but not limited to it. It should be noticed that, in the present embodiment, the second connecting line 308 is exposed by both the first slit 314 of the first pixel electrode 602 and the second slit 1114 of the third pixel electrode 1102. Accordingly, the coupling capacitance Cx in the present embodiment is much less than that of conventional arts, the difficulty of increasing the voltage difference between the first pixel electrode and the second pixel electrode is improved. Since the coupling capacitance Cx in the present embodiment is much less than that of conventional arts, increasing the voltage difference between the first pixel electrode and the second pixel electrode is much easier. Accordingly, it is not necessary to further increase the capacitance of the charge-sharing capacitor Cs. The present embodiment of the present disclosure is not only capable to improve the issue of color washout, but also enhance the LC efficiency of the LCD panel to approximately 12.45%. As aforementioned, the locations of the black lines can be also controlled and restricted at the edge of the pixel area by special pattern design of pixel electrodes (602*a*, 602*b*, 1102*a*, and 1102*b*). Therefore, the open ratio of the pixel can be further increased. In another embodiment of the present disclosure, the structures of the first sub-pixel electrode 602*a*, the second sub-pixel electrode 602*b*, the third sub-pixel electrode 1102*a* and the fourth sub-pixel electrode 1102*b* can be designed as the structures of the first sub-pixel electrode 902*a* and the second sub-pixel electrode 902*b*. That is, the first sub-pixel electrode 602*a* and the third sub-pixel electrode 1102*a* are designed as the first sub-pixel electrode 902*a*, and the second sub-pixel electrode 602*b* and the fourth sub-pixel electrode 1102*b* are designed as the second sub-pixel electrode 902*b* so that the first sub-pixel electrode 602*a* and the second sub-pixel electrode 602*b* are mirror symmetry structures with respect to the symmetry axis 914, and the third sub-pixel electrode 1102*a* and the fourth sub-pixel electrode 1102*b* are also mirror symmetry structures with respect to the symmetry axis 914. Accordingly, the LC efficiency and the open ratio of the pixel array substrate of the present embodiment are also improved under the premise of solving the issue of color washout.

Figure 13:
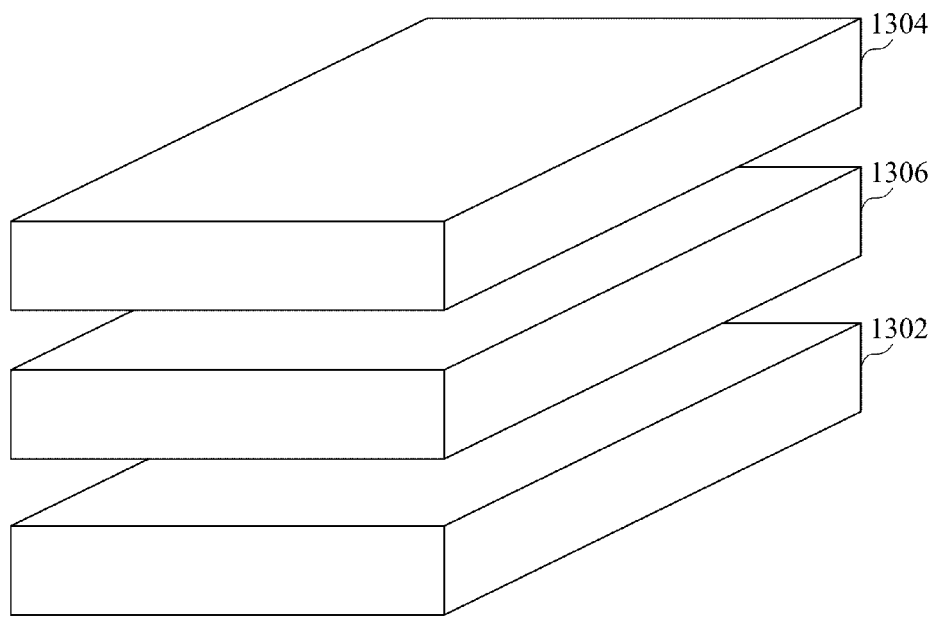
FIG. 13 illustrates a schematic diagram of the LCD panel with the pixel array substrate of the present disclosure.

Referring to FIG. 13, FIG. 13 illustrates the LCD panel 1300 of the present disclosure. The LCD panel 1300 includes a pixel array substrate 1302, an opposite substrate 1304 and a liquid crystal layer 1306. The pixel array substrate 1302 can be any one of aforementioned embodiments of pixel array substrate of the present disclosure. The opposite substrate 1304 is disposed on the pixel array substrate 1302, and the liquid crystal layer 1306 is disposed between the pixel array substrate 1302 and the opposite substrate 1304. According to the structure of LCD panel 1300, different opposite substrate 1304 can be correspondingly chosen to cope with the LCD panel 1300. The material of the liquid crystal layer 1306 can be chosen the liquid crystals with an adequate dielectric anisotropy ($\Delta \in$), and a birefringence ($\Delta n$). The birefringence ($\Delta n$) of the liquid crystals can also be coped with an adequate cell gap of the liquid crystal layer 1306 to achieve the predetermined transmittance. The opposite substrate 1304 can optionally further includes a color filter. The opposite substrate 1304 can also be called a color filter substrate.

It should be noticed that the pixel array substrate of the present disclosure has a whole new design of pixel layout. Therefore, the coupling capacitance Cx of the pixel array substrate in the present disclosure is much less than that of prior arts, the difficulty of increasing the voltage difference between the first pixel electrode and the second pixel electrode is obviously improved. Accordingly, LC efficiency and the open ratio of the pixel array substrate of the present disclosure are also improved under the premise of solving the issue of color washout.

Although the present disclosure has been described in considerable detail with reference to certain embodiments thereof, other embodiments are possible. Therefore, the spirit and scope of the appended claims should not be limited to the description of the embodiments contained herein.

It will be apparent to those ordinarily skilled in the art that various modifications and variations may be made to the structure of the present disclosure without departing from the scope or spirit of the disclosure. In view of the foregoing, it is intended that the present disclosure cover modifications and variations thereof provided they fall within the scope of the following claims.

What is claimed is:

1. A pixel array substrate, comprising:
a plurality of data lines;
a plurality of scan lines crossed to the plurality of data lines to define a plurality of pixel areas; and
a plurality of pixels respectively disposed in the plurality of pixel areas, each of the pixels comprising:
a first pixel electrode electrically connected to a corresponding one of the data lines and scan lines, the first pixel electrode having a first slit;
a first connecting line, the first pixel electrode electrically connected to corresponding data line through the first connecting line;
a second pixel electrode electrically connected to corresponding data line and scan line; and
a second connecting line, the second pixel electrode electrically connected to the corresponding data line through the second connecting line, wherein at least a part of the second connecting line is exposed by the first slit of the first pixel electrode, the first pixel electrode comprises a first sub-pixel electrode and a second sub-pixel electrode, the first slit is substantially positioned between the first sub-pixel electrode and the second sub-pixel electrode, and the first sub-pixel electrode comprises:
a first main electrode;
a second main electrode, the first main electrode and the second main electrode being electrically connected and are substantially orthogonally arranged to define a first area, a second area, a third area and a fourth area;
a plurality of first branch electrodes disposed in the first area;
a plurality of second branch electrodes disposed in the second area;
a plurality of third branch electrodes disposed in the third area; and
a plurality of fourth branch electrodes disposed in the fourth area,
wherein the plurality of first branch electrodes, the plurality of second branch electrodes, the plurality of third branch electrodes and the plurality of fourth branch electrodes are electrically connected with at least one of the first main electrode and the second main electrode, the first branch electrodes are arranged parallel to each other, the second branch electrodes are arranged parallel to each other, the third branch electrodes are arranged parallel to each other and the fourth branch electrodes are arranged parallel to each other, and the plurality of first branch electrodes, the plurality of second branch electrodes, the plurality of third branch electrodes and the plurality of fourth branch electrodes respectively extend to different directions from the first main electrode or the second main electrode.

2. The pixel array substrate of claim 1, wherein the first slit is an open slit.

3. The pixel array substrate of claim 1, wherein the first slit is a closed slit.

4. The pixel array substrate of claim 1, wherein the first slit is substantially parallel to the plurality of data lines.

5. The pixel array substrate of claim 1, wherein the first connecting line and the second connecting line are electrically connected to the same data line.

6. The pixel array substrate of claim 1, wherein the first connecting line and the second connecting line are electrically connected to different data lines.

7. The pixel array substrate of claim 1, wherein the first sub-pixel electrode and the second sub-pixel electrode are mirror symmetry structures with respect to the first slit.

8. The pixel array substrate of claim 1, wherein the first main electrode is substantially parallel to the first slit, and the distance between the first main electrode and the first slit is greater than that between the first main electrode and the data line which is adjacent to the first main electrode.

9. The pixel array substrate of claim 1, each of the pixels further comprising:
  a third pixel electrode electrically connected to corresponding data line and scan line, the third pixel electrode having a second slit; and
  a third connecting line, the third pixel electrode electrically connected to the corresponding data line through the third connecting line;
  wherein at least a part of the second connecting line is exposed by the first slit of the first pixel electrode and the second slit of the third pixel electrode.

10. The pixel array substrate of claim 9, wherein the third connecting line is disposed on an edge of the first sub-pixel electrode or the second sub-pixel electrode, the third pixel electrode comprises a third sub-pixel electrode and a fourth sub-pixel electrode, the second slit is substantially positioned between the third sub-pixel electrode and the fourth sub-pixel electrode, and the second slit is substantially positioned along the extending line of the first slit, the first slit and the second slit are substantially parallel to the plurality of data line, the first sub-pixel electrode and the second sub-pixel electrode are mirror symmetry structures with respect to the first slit, the third sub-pixel electrode and the fourth sub-pixel electrode are mirror symmetry structures with respect to the second slit.

11. The pixel array substrate of claim 10, wherein the third sub-pixel electrode and the fourth sub-pixel electrode respectively comprise:
  a first main electrode;
  a second main electrode, the first main electrode and the second main electrode being electrically connected and are substantially orthogonally arranged to define a first area, a second area, a third area and a fourth area;
  a plurality of first branch electrodes disposed in the first area;
  a plurality of second branch electrodes disposed in the second area;
  a plurality of third branch electrodes disposed in the third area; and
  a plurality of fourth branch electrodes disposed in the fourth area,
  wherein the plurality of first branch electrodes, the plurality of second branch electrodes, the plurality of third branch electrodes and the plurality of fourth branch electrodes are electrically connected with one of the first main electrodes and the second main electrodes, the first branch electrodes are arranged parallel to each other, the second branch electrodes are arranged parallel to each other, the third branch electrodes are arranged parallel to each other and the fourth branch electrodes are arranged parallel to each other, and the plurality of first branch electrodes, the plurality of second branch electrodes, the plurality of third branch electrodes and the plurality of fourth branch electrodes respectively extend to different directions from the first main electrode or the second main electrode, the first sub-pixel electrode and the second sub-pixel electrode are mirror symmetry structures with respect to the first slit, the third sub-pixel electrode and the fourth sub-pixel electrode are mirror symmetry structures with respect to the second slit, the first main electrode of the first sub-pixel electrode is substantially parallel to the first slit, and the distance between the first main electrode and the first slit is greater than that of the first main electrode of the first sub-pixel electrode and the data line which is adjacent to the first main electrode of the first sub-pixel electrode, the first main electrode of the third sub-pixel electrode is substantially parallel to the second slit, and the distance between the first main electrode of the third sub-pixel electrode and the second slit are greater than that of the first main electrode of the third sub-pixel electrode and the data line which is adjacent to the first main electrode of the third sub-pixel electrode.

12. The pixel array substrate of claim 1, further comprising:
  a plurality of first switches respectively disposed on a side of each of the pixel areas, a first end of each first switch being electrically connected to the respective first pixel electrodes through the first connecting line, a second end of each of the first switches being electrically connected to a corresponding one of the data lines and scan lines; and
  a plurality of second switches respectively disposed on the side of each of the pixel areas and electrically connected to a corresponding one of the data lines and scan lines, each of the second switches being electrically connected to the second pixel electrode through the second connecting line.

13. The pixel array substrate of claim 12, each one of the plurality of pixels further comprising:
  a charge-sharing capacitor; and
  a third switch,
  wherein a first end of the charge-sharing capacitor is electrically connected to the first pixel electrode, a second end of the charge-sharing capacitor is electrically connected to the second pixel electrode through the third switch.

14. A pixel array substrate, comprising:
  a plurality of data lines;
  a plurality of scan lines; and
  a plurality of pixels, each of the pixels comprising:
    a first pixel electrode electrically connected to a corresponding one of the data lines and scan lines, the first pixel electrode comprising:
      a first sub-pixel electrode comprising:
        a first main electrode;
        a second main electrode, the first main electrode and the second main electrode being electrically connected and are substantially orthogonally arranged to define a first area, a second area, a third area and a fourth area;
        a plurality of first branch electrodes disposed in the first area;
        a plurality of second branch electrodes disposed in the second area;
        a plurality of third branch electrodes disposed in the third area; and
        a plurality of fourth branch electrodes disposed in the fourth area,
        wherein the plurality of first branch electrodes, the plurality of second branch electrodes, the plurality of third branch electrodes and the plurality of fourth branch electrodes are electrically connected with one of the first main electrode and the second main electrode, the first branch electrodes are arranged parallel to each other, the second branch electrodes are arranged parallel to each other, the third branch electrodes are arranged parallel to each other and the fourth branch electrodes are arranged parallel to each other, and the plurality of first branch electrodes, the plurality of second branch electrodes, the plurality of third branch electrodes and the plurality of fourth branch electrode respectively extend to different directions from the first main electrode or the second main electrode;

a second pixel electrode electrically connected to a corresponding one of the data lines and scan lines; and a second connecting line, the second pixel electrode being electrically connected to a corresponding one of the data lines through the second connecting line, and the distance between the first main electrode and the second connecting line is greater than that between the first main electrode and the data line which is adjacent to the first main electrode.

15. The pixel array substrate of claim 14, wherein the second connecting line is substantially parallel to the plurality of data lines, the distance between the second connecting line and one adjacent data line is the same as that between the second connecting line and the other adjacent data line.

16. The pixel array substrate of claim 14, wherein the first main electrode is substantially parallel to a symmetry axis, and the first pixel electrode further comprises a second sub-pixel electrode electrically connected to the first sub-pixel electrode, wherein the first sub-pixel electrode and the second sub-pixel electrode are mirror symmetry structures with respect to the symmetry axis.

17. The pixel array substrate of claim 16, wherein the second connecting line is positioned along the direction of the symmetry axis.

18. The pixel array substrate of claim 17, wherein the first pixel electrode has a first slit which is along the direction of the symmetry axis to expose a part of the second connecting line.

19. The pixel array substrate of claim 17, further comprising:

a third pixel electrode disposed between the first pixel electrode and the second pixel electrode, and electrically connected to a corresponding one of the data lines and scan lines, the third pixel electrode comprising:

a third sub-pixel electrode; and a fourth sub-pixel electrode electrically connected to the third sub-pixel electrode, wherein the third sub-pixel electrode and the fourth sub-pixel electrode are mirror symmetry structures with respect to the symmetry axis, the third sub-pixel electrode and the fourth sub-pixel electrode respectively comprising:

a first main electrode;

a second main electrode, the first main electrode and the second main electrode being electrically connected and substantially orthogonally arranged to define a first area, a second area, a third area and a fourth area;

a plurality of first branch electrodes disposed in the first area;

a plurality of second branch electrodes disposed in the second area;

a plurality of third branch electrodes disposed in the third area; and a plurality of fourth branch electrodes disposed in the fourth area, wherein the plurality of first branch electrodes, the plurality of second branch electrodes, the plurality of third branch electrodes and the plurality of fourth branch electrodes are electrically connected with one of the first main electrode and the second main electrode, the first branch electrodes are arranged parallel to each other, the second branch electrodes are arranged parallel to each other, the third branch electrodes are arranged parallel to each other and the fourth branch electrodes are arranged parallel to each other, and the plurality of first branch electrodes, the plurality of second branch electrodes, the plurality of third branch electrodes and the plurality of fourth branch electrodes respectively extend to different directions from the first main electrode or the second main electrode.

20. The pixel array substrate of claim 19, wherein the first main electrode of the first sub-pixel electrode and the first main electrode of the third sub-pixel electrode are substantially parallel to the symmetry axis, and the distance between the first main electrode and the symmetry axis is greater then that between the first main electrode and adjacent data line, the first pixel electrode has a first slit which is along the direction of the symmetry axis, the third pixel electrode has a second slit which is also along the direction of the symmetry axis, and a part of the second connecting line is exposed by the first slit and the second slit.

* * * * *